US010150495B2

(12) United States Patent
Taylor et al.

(10) Patent No.: US 10,150,495 B2
(45) Date of Patent: Dec. 11, 2018

(54) WHEEL LOCKING MECHANISM

(71) Applicant: Silver Cross (IP) Limited, Skipton (GB)

(72) Inventors: Philip Taylor, Skipton (GB); Christopher Bird, Skipton (GB)

(73) Assignee: Silver Cross (IP) Limited, Skipton, North (GB)

( * ) Notice: Subject to any disclaimer, the term of this patent is extended or adjusted under 35 U.S.C. 154(b) by 0 days.

(21) Appl. No.: 15/622,831

(22) Filed: Jun. 14, 2017

(65) Prior Publication Data

US 2017/0361859 A1 Dec. 21, 2017

(30) Foreign Application Priority Data

Jun. 17, 2016 (GB) .................................. 1610580.1

(51) Int. Cl.
*F16D 63/00* (2006.01)
*B62B 5/04* (2006.01)
*B62B 9/08* (2006.01)

(52) U.S. Cl.
CPC ............ *B62B 5/0457* (2013.01); *B62B 5/048* (2013.01); *B62B 5/0433* (2013.01);
(Continued)

(58) Field of Classification Search
CPC ... F16D 63/006; B62B 5/0457; B62B 5/0433; B62B 5/0461; B62B 5/048; B62B 9/082; B62B 9/087
(Continued)

(56) References Cited

U.S. PATENT DOCUMENTS 2,176,472 A * 10/1939 Rogers .................... B62B 9/085
188/20
2,425,574 A * 8/1947 Stewack ................. B62B 9/085
188/20
(Continued)

FOREIGN PATENT DOCUMENTS

CN 201 169 278 Y 12/2008
CN 201 272 392 Y 7/2009
(Continued)

OTHER PUBLICATIONS

United Kingdom Search Report issued in Application No. GB1610580.1 dated Oct. 3, 2016, 4 pgs.
(Continued)

*Primary Examiner* — Thomas J Williams
(74) *Attorney, Agent, or Firm* — Woodard, Emhardt, Moriarty, McNett & Henry, LLP; Charles Meyer (57) ABSTRACT

A wheel locking mechanism, suitable for locking a wheel of a pushchair, the mechanism comprising: a rotatable member, adapted to be mounted on the hub of a wheel, whereby the rotatable member is co-rotatable with, and by rotation of, the wheel, the rotatable member comprising a locking surface, and a non-rotatable member, comprising a locking pin adapted to selectively cooperate with the locking surface of the rotatable member, whereby the relative positions of the rotatable and non-rotatable members are lockable. Also disclosed is a pushchair comprising a chassis having a rear axle, at each end of which a wheel is mountable, wherein each end of the rear axle is provided with such a wheel locking mechanism.

23 Claims, 9 Drawing Sheets

(52) U.S. Cl.
CPC ............ *B62B 5/0461* (2013.01); *B62B 9/082* (2013.01); *B62B 9/087* (2013.01); *F16D 63/006* (2013.01)

(58) Field of Classification Search
USPC ........................................ 188/19, 20, 31, 69
See application file for complete search history.

(56) References Cited

U.S. PATENT DOCUMENTS

| | | | | |
|---|---|---|---|---|
| 3,200,907 | A * | 8/1965 | Hansen ................... | B60T 1/005 188/167 |
| 4,369,867 | A * | 1/1983 | Lemieux ................. | B60T 1/005 188/31 |
| 4,616,888 | A * | 10/1986 | Peterman ............... | A47B 53/02 188/167 |
| 4,997,066 | A * | 3/1991 | Bigo ....................... | B62B 9/082 188/20 |
| 5,685,406 | A * | 11/1997 | Crum ...................... | B60T 1/005 188/31 |
| 5,893,439 | A * | 4/1999 | Park ........................ | B60T 1/005 188/31 |
| 6,170,615 | B1 * | 1/2001 | Cheng ..................... | B62B 9/082 188/20 |
| 6,279,713 | B1 * | 8/2001 | Young ..................... | B60T 1/005 188/31 |
| 6,341,672 | B1 * | 1/2002 | Yang ....................... | B62B 9/082 188/20 |
| 6,484,851 | B2 * | 11/2002 | Song ....................... | B60T 1/005 188/265 |
| 7,367,432 | B2 * | 5/2008 | Chen ....................... | B62B 7/08 188/19 |
| 7,383,925 | B2 * | 6/2008 | Chen ....................... | B62B 9/082 188/19 |
| 7,537,093 | B2 * | 5/2009 | Chen ....................... | B62B 9/082 188/2 F |
| 2001/0042669 | A1 * | 11/2001 | Arakawa ................. | B60T 1/005 192/219.5 |
| 2004/0178025 | A1 | 9/2004 | Zweideck | |
| 2007/0045055 | A1 * | 3/2007 | Lan ......................... | B62B 9/08 188/20 |
| 2007/0051565 | A1 | 3/2007 | Chen | |
| 2011/0186400 | A1 * | 8/2011 | Villeneuve ............. | B60T 1/005 192/219.5 |

FOREIGN PATENT DOCUMENTS

| | | | | |
|---|---|---|---|---|
| CN | 201 777 285 | U | 8/2010 | |
| CN | 202 089 099 | U | 12/2011 | |
| CN | 202 243 606 | U | 5/2012 | |
| EP | 0 064 368 | A2 | 11/1982 | |
| EP | 2 662 262 | A2 | 11/1982 | |
| EP | 1 447 301 | A2 | 8/2004 | |
| EP | 1 688 336 | A2 | 8/2006 | |
| EP | 2 169 254 | A1 | 3/2010 | |
| EP | 2 805 867 | A2 | 11/2014 | |
| GB | 2297133 | A * | 7/1996 | ............. B62B 9/082 |
| GB | 2482589 | A | 2/2012 | |
| JP | 10157631 | A * | 6/1998 | ............. B62B 9/08 |
| KR | 20140053218 | A * | 5/2014 | ............. B62B 9/085 |

OTHER PUBLICATIONS

European Search Report issued in Application No. 17168545.6-1012 dated Mar. 22, 2018, 14 pgs.
European Search Report issued in Application No. 17168545.6-1760 dated Nov. 14, 2017, 16 pgs.

* cited by examiner

WHEEL LOCKING MECHANISM

CROSS-REFERENCE TO RELATED APPLICATIONS

The present application claims priority to United Kingdom Patent Application No. 1610580.1, filed Jun. 17, 2016, which is incorporated herein by reference.

FIELD OF THE DISCLOSURE

The present invention relates to a wheel locking mechanism, also known as a parking brake mechanism, for a pushable cart suitable for transporting infants, such as a pushchair. The wheel locking mechanism is designed to be easily and effectively used, i.e. the pushchair can be easily parked and subsequently pushed as desired.

BACKGROUND

In a pushchair, the infant occupies a carrier. Such pushchairs are typically configured to enable releasable attachment of the carrier from the frame or chassis of the pushchair to enable multiple different carrier types (such as car seats, carrycots, etc.) to be used interchangeably.

Just as there are many variations in the combinations and styles of frames and carriers, there arc also many variations of wheel locking mechanisms known in the art typically a pushchair manufacturer/design house will design the frames or chassis of one or more of its pushchair offerings to include a proprietary wheel locking mechanism. In addition to being a point of differentiation from one brand of pushchair to another, pushchair manufacturers/design houses are continually looking to improve upon the performance of their own and other competing wheel locking mechanisms as to reliability, ease of use, cost, complexity, etc.

SUMMARY

The inventors of the herein disclosed wheel locking mechanism have improved upon existing wheel locking mechanisms by providing, according to a first aspect of the invention, a wheel locking mechanism, suitable for locking a wheel of a pushchair, the mechanism comprising: (a) a rotatable member, adapted to be mounted on the hub of a wheel, whereby the rotatable member is co-rotatable with, and by rotation of, the wheel, said rotatable member comprising a locking surface, and (b) a non-rotatable member, adapted to be mounted on, or to be comprised in, the chassis of a pushchair, said non-rotatable member comprising a locking pin adapted to selectively cooperate with the locking surface of the rotatable member, whereby the relative positions of the rotatable and non-rotatable members are lockable.

Optionally, the rotatable member may further comprise a locking actuator and a locking release, in embodiments in which a pair of wheel locking mechanisms may be provided, typically one for each rear wheel of a pushchair, although the underlying principle of operation of the pair of mechanisms may be the same, there may be differences in their constructions, e.g. in relation to the configuration of the respective locking actuators and locking releases.

Preferably, the locking pin may be pivotally mounted with respect to both the locking actuator and the locking release.

The locking actuator may be selectively movable to cause the locking pin to pivot into cooperation with the locking surface of the rotatable member. Many variants of locking surface are possible, e.g. pre-machine holes or recesses in the rotatable member, however, advantageously, the locking surface may be a toothed surface.

Furthermore, the locking pin may be caused to immediately lock into a recess between two adjacent teeth on the toothed surface. However, it is also possible that the locking pin may be caused to pivot into a primed position in contact with the toothed surface, prior to being urged into a recess between two adjacent teeth on the toothed surface. As to whether the former "direct" locking or the latter "indirect" locking is adopted/achieved will depend on the relative positions of the rotatable and non-rotatable members at the point at which the locking actuator is actuated, and whether or not the locking pin of the non-rotatable member is in alignment with a recess in the toothed locking surface of the rotatable member.

Notwithstanding the two possibilities above, the locking release is preferably movable to cause the locking pin to pivot out of cooperation with the locking surface of the rotatable member, whereby the relative positions of the rotatable and non-rotatable members are unlockable.

In addition, or as an alternative, to the locking pin preferably being pivotally mounted with respect to both the locking actuator and the locking release, the locking pin may be slidably mounted with respect to both the locking actuator and the locking release. In a preferred embodiment, the locking pin may be both pivotally mounted and slidably mounted with respect to both the locking actuator and the locking release.

In addition, or as a further alternative, to the preceding paragraph, the locking pin may be resiliently mounted with respect to both the locking actuator and the locking release. In a preferred embodiment, the locking pin may be pivotally mounted, slidably mounted and resiliently mounted with respect to both the locking actuator and the locking release.

Typically, the non-rotatable member pray comprise a semi-rotatable portion and a non-rotatable housing, wherein the semi-rotatable portion may be mounted on, and may be semi-rotatable with respect to, the non-rotatable housing.

Furthermore, the semi-rotatable portion may be resiliently mounted on the non-rotatable housing. In particular, a first helical spring may connect the semi-rotatable portion to the non-rotatable housing.

Advantageously, the locking pin may be mounted in, and moreover may be non-rotatable with respect to, the non-rotatable housing.

In embodiments where the rotatable member further comprises a locking actuator and a locking release, the semi-rotatable portion of the non-rotatable member may include said locking actuator and said locking release, and furthermore, both said locking release and said locking actuator may be accessible externally of the non-rotatable housing to a user of the mechanism.

The semi-rotatable portion may beneficially include a ramped surface, adapted to face into the non-rotatable housing, wherein the ramped surface may extend in the direction of rotation of the semi-rotatable portion. One end of the ramped surface may be provided with a lower land, and the other end of the ramped surface may be provided with an upper land—"upper" and "lower" being relative to the inner surface of the semi-rotatable portion on which the ramped surface is provided.

Preferably, the locking pin may be pivotally mounted with aspect to the ramped surface, and also o each of the upper and lower lands.

In embodiments where the locking pin is at least slidably mounted with respect to both the locking actuator and the locking release, the locking pin may be slidably mounted with respect to the ramped surface, and also each of the upper and lower lands.

In embodiments where the locking pin is at least resiliently mounted with respect to both the locking actuator and the locking release, the locking pin may be resiliently mounted with respect to the ramped surface, and also each of the upper and lower lands.

The locking pin may be pivotally mounted with respect to a first end of a movable bar. Preferably, a second end of the movable bar may be in sliding contact with the ramped surface of the semi-rotatable portion, whereby the locking pin may be slidable towards and away from the semi-rotatable portion. Further preferably, or alternatively, the locking pin may be slidable towards and away from both the locking actuator and the locking release. In one embodiment, the locking pin may be pivotally mounted about a pivot to the first end of the movable bar via a connection piece in which the pivot is located. The connection piece may include a hinged portion, which may connect the connection piece to the first end of the movable bar, thus allowing the connection piece to move.

In addition, or as an alternative, to the locking pin preferably being resiliently mounted with respect to the ramped surface of the semi-rotatable portion, the locking pin may be resiliently mounted with respect to a first end of a movable bar, or, in embodiments where the locking pin may be pivotally mounted with respect to a first end of a movable bar, the locking pin may also be resiliently mounted with respect to the first end of the movable bar. In particular, a second helical spring may connect the locking pin to the first end of the movable bar.

In embodiments where the semi-rotatable portion includes the locking actuator and the locking release, the locking release may be resiliently mounted with respect to, and movable with, the locking actuator. In particular, a third helical spring may be provided to resiliently mount the locking release with respect to the locking actuator.

Advantageously, when the relative positions of the rotatable and non-rotatable members are unlocked, such that the wheel is free to rotate, the locking actuator may be in a non-use position and the locking release may be in a primed position, whereby the first helical spring may be relaxed and the third helical spring may be compressed.

Furthermore, when the relative positions of the rotatable and non-rotatable members are locked, such that the wheel is prevented from rotating, the locking actuator may be in a use position and the locking release may be in a non-primed position, such that the first helical spring may be under tension and the third helical spring may be relaxed.

Advantageously, the non-rotatable housing may include a pair of elongate stops, against which the locking release may stop when in its primed position, and an abutment, against which the locking release may abut when in its non-primed position.

The configuration of a wheel locking mechanism according to the invention may be such that actuation of the locking actuator, to causes it to move from its non-use position to its use position, causes the locking release to move from its primed position to its non-primed position.

Moreover, actuation of the locking actuator may cause the locking release to move out of contact with the elongate stops, thereby releasing compression in the third helical spring.

The configuration of a wheel locking mechanism according to the invention may be such that actuation of the locking actuator causes rotation of the semi-rotatable portion and the ramped surface thereof, whereby the locking pin may be caused to cooperate with the locking surface of the rotatable member.

Furthermore, the locking pin may be caused to pivot into cooperation with the locking surface of the rotatable member.

The configuration of a wheel locking mechanism according to the invention may be such that release of the locking release causes the locking release to move out of contact with the abutment, thereby releasing tension in the first helical spring connecting the semi-rotatable portion to the non-rotatable housing.

In such a configuration, release of the locking release may causes rotation of the semi-rotatable portion and the ramped surface thereof, whereby the locking pin may be caused to be non-cooperative with the locking surface.

Furthermore, the locking pin may be caused to pivot out of cooperation with the locking surface of the rotatable member.

Typically, rotation of the semi-rotatable portion that may be caused by the release may be in an opposite direction to the rotation that may be caused by actuation of the locking actuator.

Advantageously, the locking actuator may be a foot pedal, adapted to be depressed by a user of the mechanism.

Further advantageously, the locking release may comprise a foot button, adapted to be depressed by a user of the mechanism.

Preferably, the locking release may be internal of the non-rotatable member, except for the foot button, which may be external of the non-rotatable member.

For the avoidance of any doubt, any and all of the aforementioned "preferable", "advantageous", "beneficial", i.e. non-essential, features of the invention may be combined with any one or more of the other of such features. All such combinations are hereby contemplated and within the scope of the present invention.

The present invention also provides, in a second aspect, a pushchair comprising a chassis having a rear axle, at each end of which a wheel is mountable, wherein each end of the rear axle is provided with a wheel locking mechanism as hereinbefore defined in the first aspect of the invention.

The chassis may be of the three-wheeled type or the four-wheeled type; with either of these, the rear axle is provided with two of the three (or four) wheels.

Advantageously, one of the said two wheel locking mechanisms provided on the ends of the rear axle of the pushchair may comprise a locking actuator and a locking release in the rotatable member thereof.

Furthermore, the other of the said two wheel locking mechanisms may be operable by the said locking actuator and the said locking release of the one wheel locking mechanism provided therewith, via a linking cable.

The linking cable may be connectable to each of the said wheel locking mechanisms by means of the semi-rotatable portions of each. Rotation of the semi-rotatable portion of the wheel locking mechanism provided with the locking actuator and locking release is transmittable by the linking cable to the semi-rotatable portion of the other wheel locking mechanism, causing rotation of its semi-rotatable portion, leading to movement of the locking pin in the said other wheel locking mechanism in the same way as the movement of the locking pin in the wheel locking mechanism provided with the locking actuator and locking release. In other words, the other wheel locking mechanism provides the same function as the wheel locking mechanism provided with the locking actuator and locking release in terms of locking and unlocking of the wheel, as described above.

For the avoidance of any doubt, any and all of the aforementioned "preferable", "advantageous", "beneficial", i.e. non-essential, features of the invention described in combination with the wheel locking mechanism according to the first aspect of the invention are applicable and combinable with any one or more features of the pushchair according to the second aspect of the invention. All such combinations are hereby contemplated and within the scope of the present invention.

BRIEF DESCRIPTION OF THE DRAWINGS

The present invention will now be more particularly described, by way of non-limiting example only, with reference to and as shown in the accompanying drawings (not to scale) in which:

FIG. 9 is a perspective view of a part of the pushchair shown in. FIG. 8;

DESCRIPTION OF EMBODIMENTS

Figure 1A:
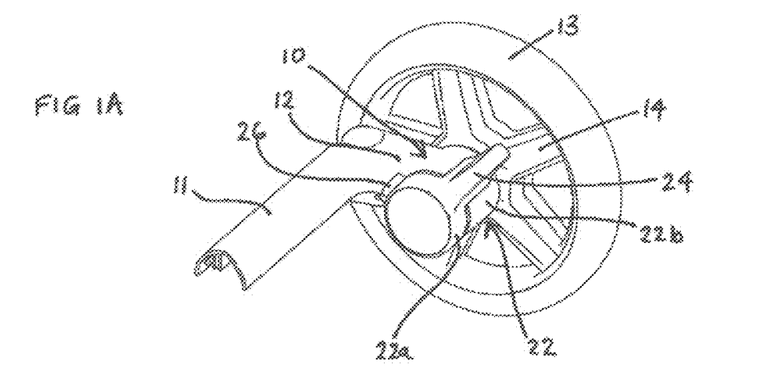
FIGS. 1A to 1C are partial perspective views of a wheel locking mechanism according to the invention in situ on the frame or chassis of a pushchair (only a portion of the frame or chassis being shown)
Figure 1B:
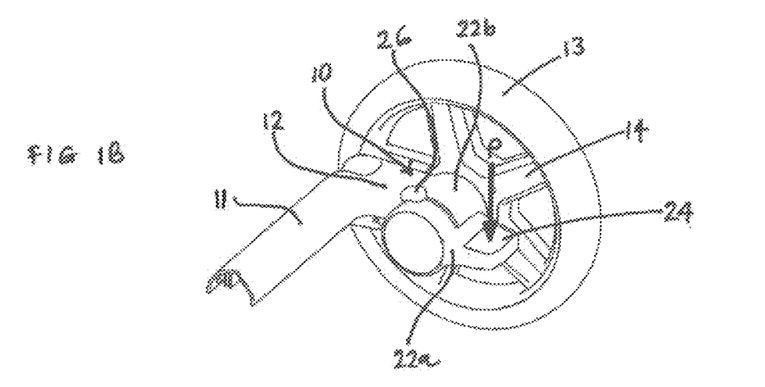
Figure 1C:
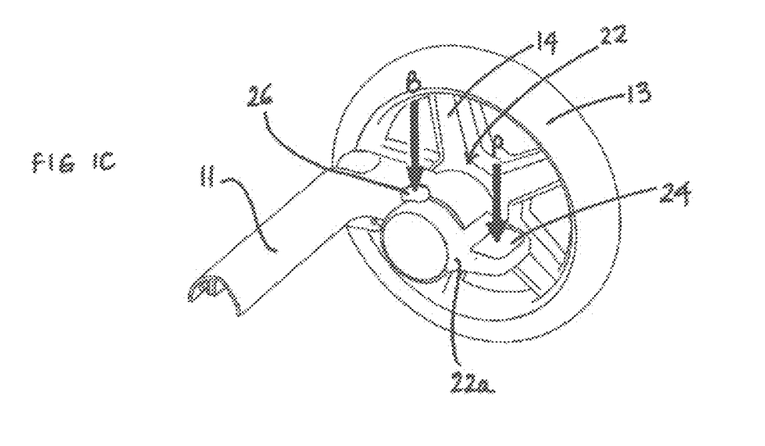

FIGS. 1A to 1C show a wheel locking mechanism 10 provided on one end of a rear axle 11 of a pushchair. The rear axle 11 includes a right-angled portion 12 at both of its ends (although only one such end is shown in FIGS. 1A to 1C), in this embodiment, the wheel locking mechanism 10 is formed integrally (at least in part) with the right-angled portion 12 of the rear axle 11, but of course the wheel locking mechanism 10 could instead be connected to the right-angled portion 12 of the rear axle 11. Also shown mounted to the right-angled portion 12 of the rear axle 11 is a wheel 13, having spokes 14 extending axially from a central hub (hidden from view).

Figure 2A:
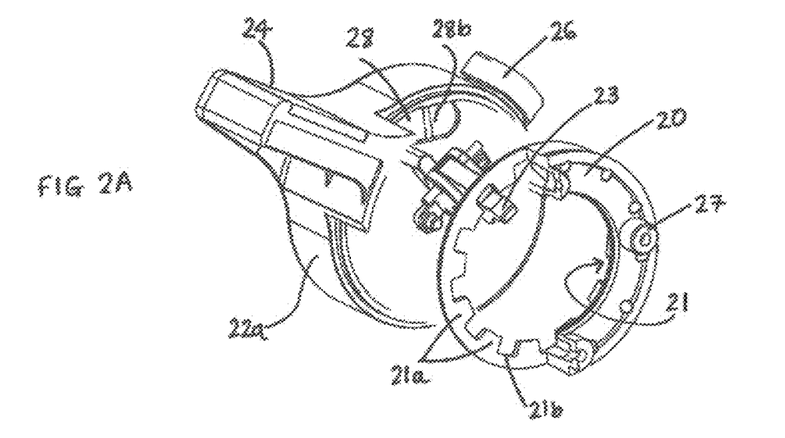
FIGS. 2A to 2C are partial exploded views of the wheel locking mechanism shown in FIGS. 1A to 1C.
Figure 2B:
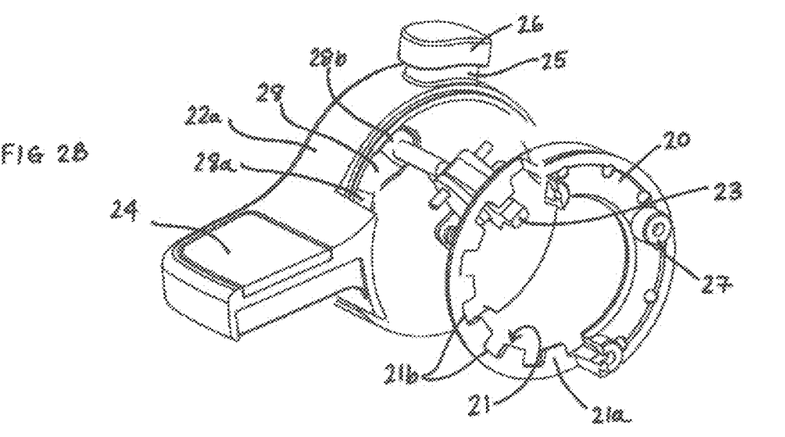
Figure 2C:
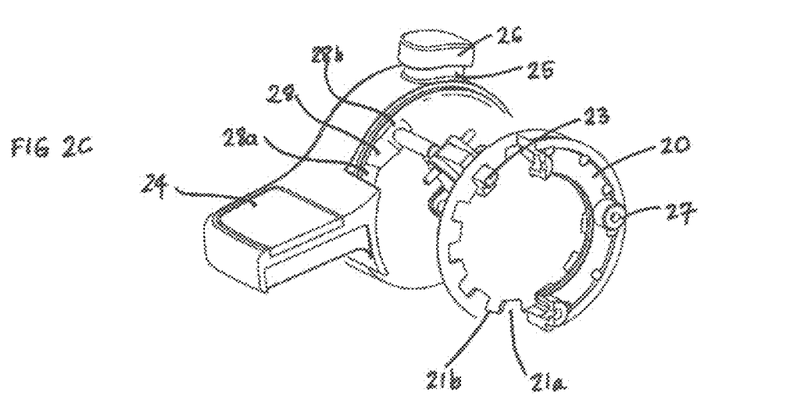

As shown in more detail in at least FIGS. 2A to 2C, the wheel locking mechanism 10 comprises a rotatable member 20 that is adapted to be mounted on/to the hub of the wheel 13, such that the rotatable member 20 is co-rotatable with, and by rotation of, the wheel 13. In other words, when the rotatable member is mounted on the hub of the wheel 13, as the Wheel is caused to rotate, the rotatable member will also be caused to rotate, but without any specific action needing to be taken in relation to the rotatable member 20; its rotation is caused solely by rotation of the wheel 13.

The rotatable member 20 is in the form of an annular member having a two opposed annular surfaces (forming first and second faces), and inner and outer peripheral surfaces there between; on the inner peripheral surface of the annular member, a locking surface 21 is provided. The locking surface 21 is in the form of a toothed surface having a plurality of cog-like teeth 21a between adjacent ones of which recesses 21b are provided. One of the opposed annular surfaces of the rotatable member 20—the surface that will face the hub of the wheel 13 to which the rotatable member 20 is mounted—is provided with a number of lugs 27 for mounting the rotatable member 20 to the wheel hub. Alternatively, the rotatable member 20 can be formed as an integral part of the hub of the wheel 13.

The wheel locking mechanism 10 further comprises a non-rotatable member 22 (shown in FIGS. 1A to 1C but omitted in part, for clarity, from FIGS. 2A to 2C). The non-rotatable member 22 includes a locking pin 23 adapted to selectively cooperate with the locking surface 21 of the rotatable member, such that the relative positions of the rotatable and non-rotatable members 20, 22 are lockable. A more detailed description of this relationship will be given below.

The non-rotatable member 22 includes a semi-rotatable portion 22a, which is resiliently mounted on, and is semi-rotatable with respect to, a non-rotatable housing 22b. By "semi-rotatable" it is meant that the rotation of the semi-rotatable portion. 22a is limited, i.e. it is not freely rotatable through 360°. Indeed, the semi-rotatable portion 22a may only be rotated through an angle that is less than 180°, and more typically less than 90°. A first helical spring 60 (shown in FIGS. 6A and 6B, and 7A and 7B connects the semi-rotatable portion 22a to the non-rotatable housing 22b, but of course any other suitably resilient means having a restorative action for connecting the semi-rotatable portion 22a to the non-rotatable housing 22b could instead be used. Further detail as to the action of the first helical spring 60 will be described below.

The semi-rotatable portion 22a of the non-rotatable member 22 comprises a locking actuator 24, in the form of a foot pedal, and also houses a locking release 25, comprising a foot button 26. Each of the foot pedal 24 and foot button 26 are adapted to be depressed by a user of the mechanism 10, i.e. a person in control of the pushchair. As is clearly seen from the figures, both the foot pedal 24 and the foot button 26 are external of the semi-rotatable portion 22a of the non-rotatable member 22, so as to be accessible for depressing by a user.

The semi-rotatable portion 22a includes a ramped surface 28 which joins a lower land 28a to an upper land 28b, and which is adapted to face into the non-rotatable housing 22b. Together, the ramped surface 28 and the lower and upper lands 28a, 28b extend in the direction of rotation of the semi-rotatable portion 22a. The lower land 28a is located a further distance away from the non-rotatable housing 22b than the upper land 28b.

The locking pin 23 is mounted in, and is non-rotatable with respect to, the non-rotatable housing 22b of the non-rotatable member 22, i.e. the angular position of the locking pin 23 with respect to the plane of the non-rotatable housing 22b is fixed. The locking pin 23 is, however, pivotally mounted with respect to both the locking actuator 24 and the locking release 25; selective movement of the locking actuator 24 causes the locking pin 23 to pivot into cooperation with the locking surface 21 of the rotatable member 20 such that the relative positions of the rotatable and non-rotatable members 20, 22 are lockable, whilst subsequent movement of the locking release 25 causes the locking pin 23 to pivot out of cooperation with the locking surface 21 of the rotatable member 20, such that the relative positions of the rotatable and non-rotatable members 20, 22 are unlockable.

Figure 3:
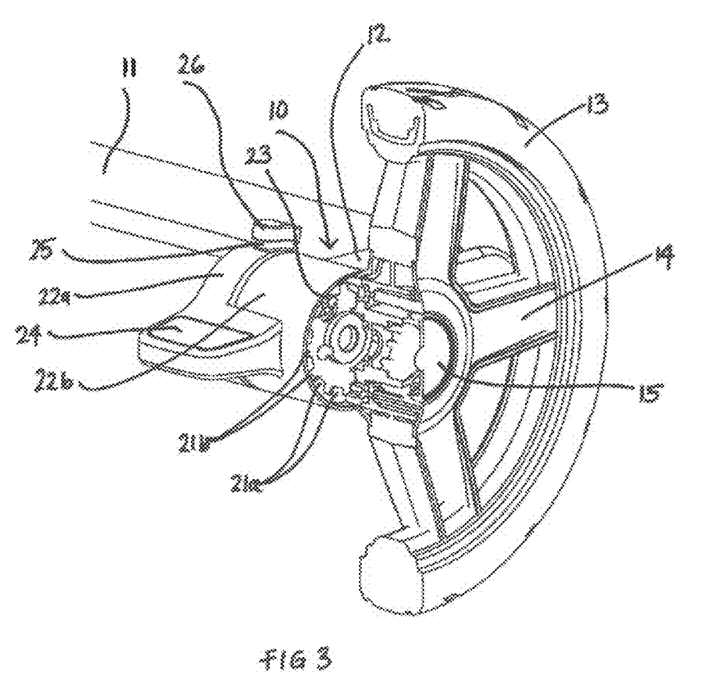
FIG. 3 is a perspective view, shown partially cut-away, of the wheel locking mechanism shown in FIGS. 1C and 2C.

Because the locking surface 21 is a toothed surface, the locking pin 23 is caused to either (1) immediately lock into a recess 21b between two adjacent teeth 21a on the toothed surface such a locked configuration being shown in FIGS. 2C and 3, or (2) pivot into a primed position in contact with the toothed surface such a primed configuration is shown in FIG. 2B, prior to being urged into a recess 21b between two adjacent teeth 21a on the toothed surface. Such urging may be achieved, in part, by a slight nudge of the pushchair in either a forward or backward direction to provide the further amount of rotation required to cause the locking pin 23 to align with a recess 21b and lock into position therein.

Figure 4A:
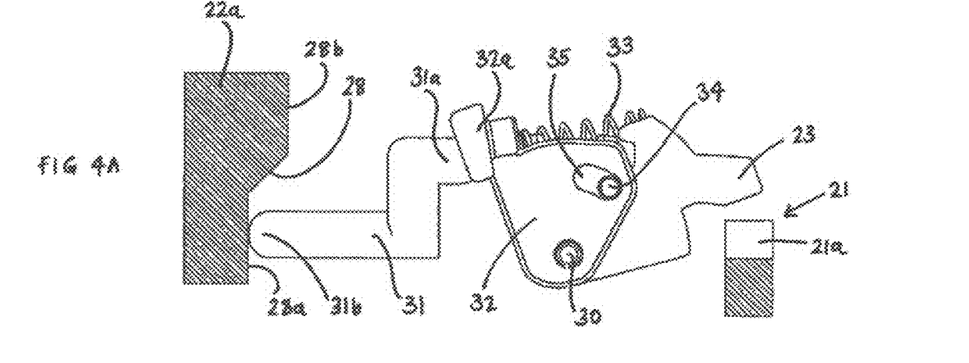
FIGS. 4A to 4C are side views of part of the wheel locking mechanism shown in FIGS. 2A to 2C.
Figure 4B:
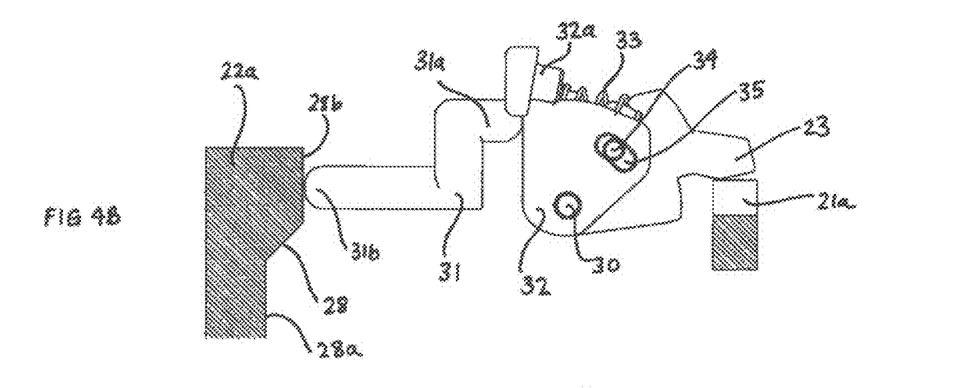
Figure 4C:
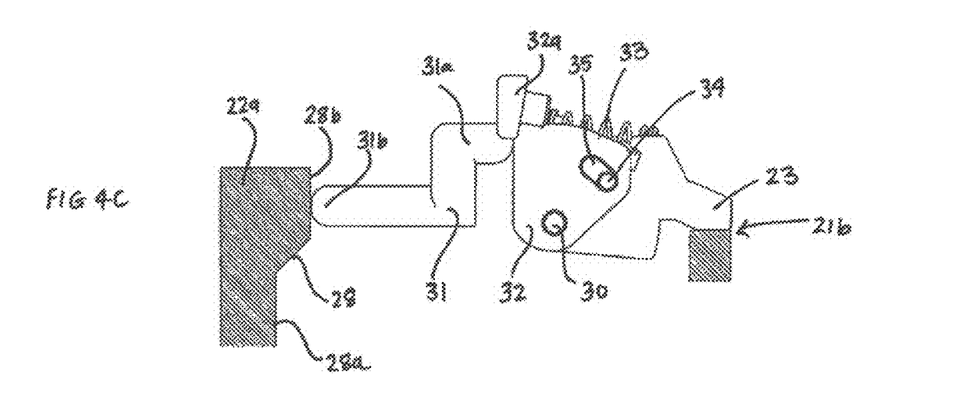
Figure 5A:
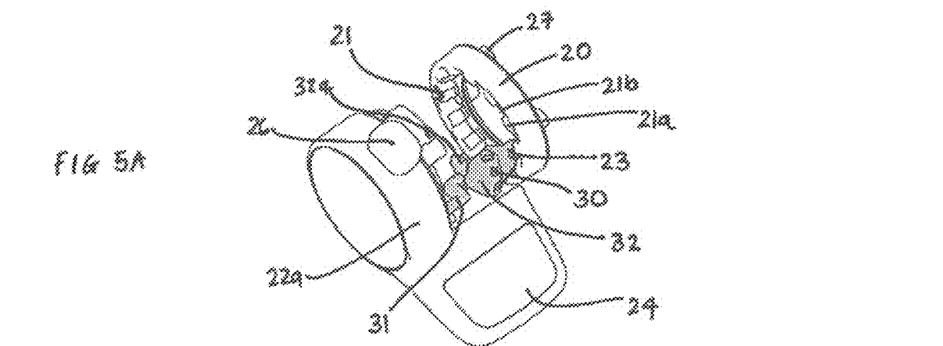
FIGS. 5A to 5C are, partial perspective views of the wheel locking mechanism shown in FIGS. 2A to 2C.
Figure 5B:
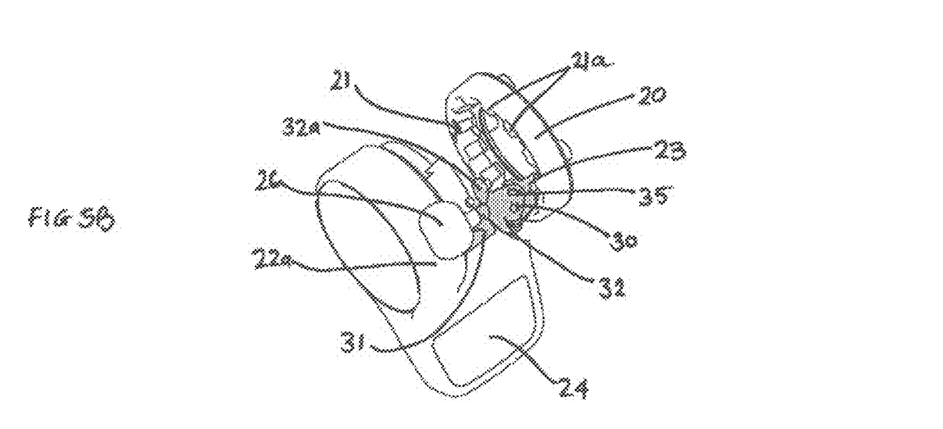
Figure 5C:
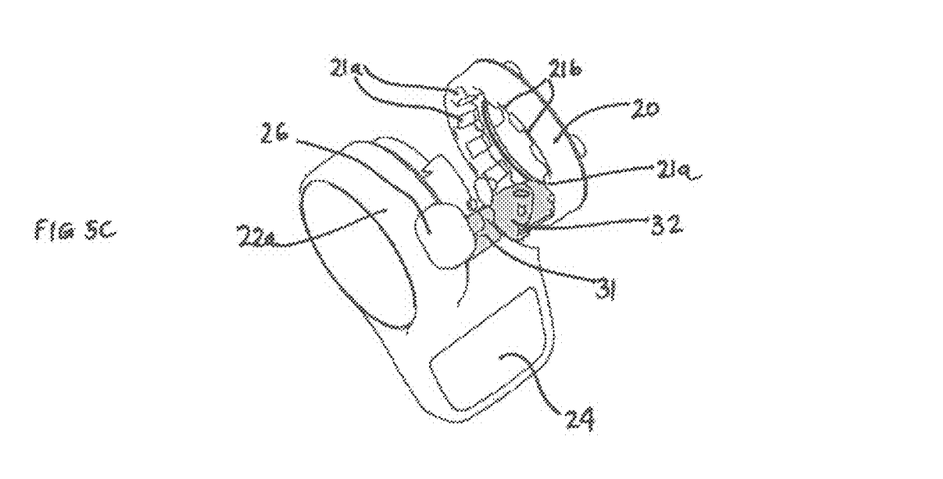

As shown in more detail in FIGS. 4A to 4C and FIGS. 5A to 5C (noting that the configurations in FIGS. 4A to 4C are the same as those in. FIGS. 5A to 5C respectively), the locking pin 23 is pivotally mounted about a pivot 30 to a first end 31a of a movable bar 31 via a connection piece 32 in which the pivot 30 is located. Connection piece 32 includes a hinged portion 32a which connects connection piece 32 to the first end 31a of the movable bar 31, and allows connection piece 32 to flex between the position shown in FIGS. 4A and 5A and the position shown in positions 4B, 5B, 4C and 5C. The extent of movement by flexing between these two positions is controlled by the provision of a pin 34 on the locking pin 23, which pin 34 slidably cooperates with an elongate, slightly curved, aperture 35 in the connection piece 32.

A second end 31b of the movable bar 31 is in sliding contact with the ramped surface 28 of the semi-rotatable portion 22a, such that the locking pin 23 is slidable towards and away from the semi-rotatable portion 22a. In particular, the second end 31b is slidable from a position on the lower land 28a (as shown in FIGS. 4A and 5A) via the ramped surface 28 to the upper land 28b (as shown in FIGS. 4B and 5B, and 4C and 5C). The locking pin 23 is thus not pivotally mounted and slidably mounted with respect to the ramped surface 28, and furthermore is slidable towards and away from both the locking actuator and the locking release. The importance of this relationship will be described in more detail below.

The locking pin 23 is also resiliently mounted with respect to the ramped surface 28, and in particular is resiliently mounted and connected, by means of a second helical spring 33, to the first end 31a of the movable bar 31 via the hinged portion 32a of the connection piece 32.

In FIGS. 4A and 5A, the locking pin 23 is not in contact with the toothed locking surface 21 of the rotatable member 20, the second end 31b of the movable bar 31 is located on the lower land 28a of the ramped surface 28, and the second helical spring 33 is in a relaxed position, such that the connection piece 32 is in a relaxed position with the hinged portion thereof 32a being un-flexed and the pin 34 being located at the right-hand extremity of the elongate aperture 35. In this configuration, the relative positions of the rotatable and non-rotatable members 20, 22 are unlocked such that the wheel 13 is free to rotate.

In FIGS. 4B and 5B, the locking pin 23 is in contact with the toothed locking surface 21 of the rotatable member 20—in particular with a tooth 21a thereof, the second end 31b of the movable bar 31 is located on the upper land 28b of the ramped surface 28, and the second helical spring 33 is in a first compressed position, such that the connection piece 32 is in a flexed position with the hinged portion thereof 32a being flexed and the pin 34 being located somewhere in the middle of, and towards the left-hand extremity of, the elongate aperture 35.

Clearly, sliding movement of the second end 31b of the movable bar 31 from the lower land 28a to the upper land 28b causes both compression of the helical spring 33 and flexing of the hinged portion 32a of the connection piece 32, which in turn causes the locking pin 23 to pivot into a primed position about pivot 30, thus bringing it into contact with the tooth 21a of the locking surface 21. This configuration is non-essential in achieving locking of the relative positions of the rotatable and non-rotatable members 20, 22, however, it is an intermediate configuration that may be adopted when a user seeks to park or engage the brake of the pushchair, prior to achievement of the configuration shown in FIGS. 4C and 5C.

Turning to FIGS. 4C and 5C, the locking pin 23 is locked into a recess 21b between two adjacent teeth 21a on the toothed locking surface 21 of the rotatable member 20, the second end 31b of the movable bar 31 is located on the upper land 28b of the ramped surface 28 (in the same position as shown in FIGS. 4B and 5B), and the second helical spring 33 is in a second compressed position (being less compressed than the first compression position shown in FIGS. 4B and 5B; some compression in the second helical spring 33 being released on pivoting of the locking pin 23 into the recess 21b), such that the connection piece 32 is in a flexed position with the hinged portion thereof 32a being flexed (in the same position as shown in FIGS. 4B and 5B) and the pin 34 again being located at the right-hand extremity of the elongate aperture 35.

If the optional intermediate configuration shown in FIGS. 4B and 5B is not adopted, the locking pin 23 can move from the position shown in FIGS. 4A and 5A directly to the configuration shown in FIGS. 4C and 5C. With such a mode of action, sliding movement of the second end 31b of the movable bar 31 from the lower land 28a to the upper land 28b via ramped surface 28 causes some compression of the helical spring 33 and flexing of the hinged portion 32a of the connection piece 32, which in turn causes the locking pin 23 to pivot about pivot 30 into a locked position in a recess 21b between two adjacent teeth 21a on the locking surface 21. In this configuration, the relative positions of the rotatable and non-rotatable members 20, 22 are locked and the wheel 13 is prevented from rotating, i.e. the pushchair is parked (the brake has been applied), If the optional intermediate configuration shown in FIGS. 4B and 5B is adopted, the locking pin 23 can be urged from the position shown in FIGS. 4B and 5B to the configuration shown in FIGS. 4C and 5C. With such a mode of action, the urging is achieved, in part, by a slight nudge of the pushchair in either a forward or backward direction to provide the further amount of rotation required to cause the locking pin 23 to align with a recess 21b and lock into position therein. In doing so, the locking pin 23 is caused to pivot about pivot 30 into a locked position in a recess 21b between two adjacent teeth 21a on the locking surface 21 by the compressive force in the second helical spring 33, which is partially released and causes, in part, urging of the locking pin 23 from its primed position into its locked position. In this configuration, the relative positions of the rotatable and non-rotatable members 20, 22 are locked and the wheel 13 is prevented from rotating, i.e. the pushchair is parked (the brake has been applied).

To recap on the configurations shown thus far:

FIGS. 1A, 2A, 4A and 5A show the wheel locking mechanism 10 in a configuration in which the wheel of the pushchair is unlocked, i.e. the pushchair is not parked and the brake is not applied (i.e. the foot pedal 24 has not been depressed); the wheel of the pushchair is able to rotate freely because the relative positions of the rotatable and non-rotatable members 20, 22 are unlocked because the locking pin 23 of the non-rotatable member 22 is not in contact with (i.e. is non-cooperative with) the locking surface 21 of the rotatable member 20.

FIGS. 1B, 2B, 4B and 5B show the wheel locking mechanism 10 in an intermediate configuration in which the wheel of the pushchair is not yet locked, but is primed for being locked, i.e. the pushchair is not yet properly parked although the brake has been applied (i.e. the foot pedal 24 has been depressed, as indicated in FIG. 1B by arrow P causing semi-rotation of the semi-rotatable portion 20 and thus of the ramped surface 28 and the lower and upper lands 28a, 28b); the wheel of the pushchair is able to rotate to a small degree (by no more than the radial distance occupied by a tooth 21a) so as to achieve locking of the relative positions of the rotatable and non-rotatable members 20, 22 by urging of the locking pin 23 of the non-rotatable member 22 from its primed position in contact a tooth 21a of the locking surface 21 of the rotatable member 20 to a locking position in a recess 21b between two adjacent teeth 21a on the locking surface 21.

FIGS. 1C, 2C, 3, 4C and 5C show the wheel locking mechanism 10 in a configuration in which the wheel of the pushchair is locked, i.e. the pushchair is parked and the brake has been applied (i.e. the foot pedal 24 has been depressed, as indicated in FIG. 1C by arrow P causing semi-rotation of the semi-rotatable portion 20 and thus of the ramped surface 28 and the lower and upper lands 28a, 28b) the wheel of the pushchair is prevented from rotating because the relative positions of the rotatable and non-rotatable members 20, 22 are locked because the locking pin 23 of the non-rotatable member 22 is locked into (i.e. is cooperative with) the locking surface 21 of the rotatable member 20.

In seeking to lock the wheel 13 of the pushchair, the configuration of the wheel locking mechanism may be caused to change directly from that shown in FIG. 1A, etc. to that shown in FIG. 1C, etc., or it may be cause to change from that shown in FIG. 1A, etc. to that shown in FIG. 1C via that shown in FIG. 1B, etc. As to whether the former "direct" change or the latter "indirect" change is adopted will depend on the relative positions of the rotatable and non-rotatable members 20, 22 at the point at which the foot pedal 24 is depressed, and whether or not the locking pin 23 of the non-rotatable member 22 is in alignment with a recess 21b in the toothed locking surface 23 of the rotatable member 20.

The mechanism by which the relative positions of the rotatable and non-rotatable members 20, 22 can be unlocked (from the configuration shown in FIGS. 1C, 2C, 3, 4C and 5C) will now be described.

Figure 7A:
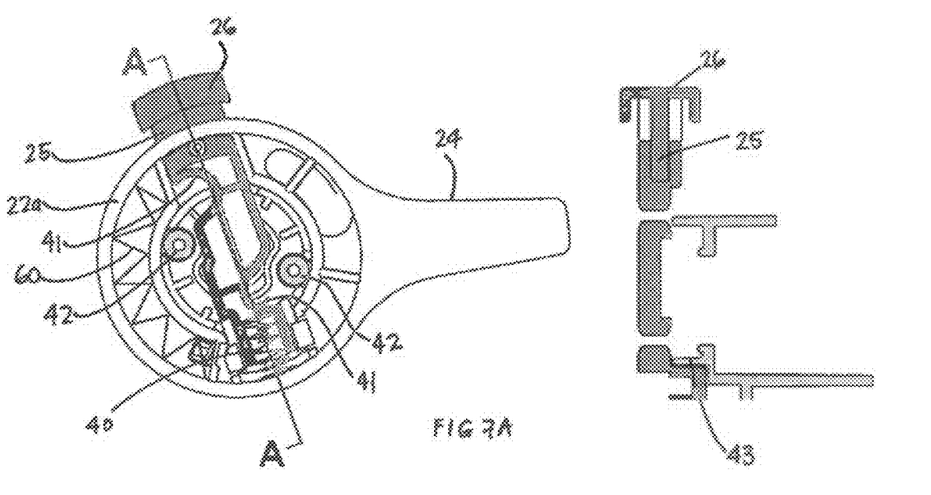
FIGS. 7A and 7B are further end views, along with partial cross-sectional views along lines A-A and B-B respectively, of the wheel locking mechanism shown in FIG. 2C.
Figure 7B:
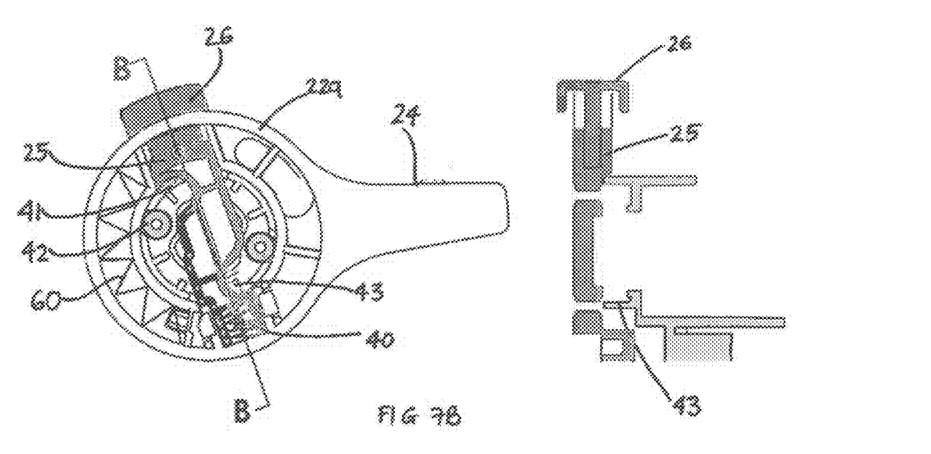

As described above, the semi-rotatable portion 22a of the non-rotatable member 22 houses a locking release 25, comprising a foot button 26, which is adapted to be depressed by a user of the mechanism 10, i.e. a person in control of the pushchair, as indicated by arrow B in FIGS. 1C and 7B. Furthermore, a first helical spring 60 connects the semi-rotatable portion 22a to the non-rotatable housing 22b, and provides a restorative action for between the rotational position of the semi-rotatable portion 22a in relation to the non-rotatable housing 22b.

FIGS. 6A and 6B, and 7A to 7B, provide further detail of the wheel locking mechanism 10 as contained within the non-rotatable member 22—in particular within the semi-rotatable portion 22a and the non-rotatable housing 22b thereof.

The locking release 25 is resiliently mounted by means of a third helical spring 40 to, and is movable with, the semi-rotatable portion 22a and the locking actuator 24. The locking release 25 is in the form of a flattened bar having the foot button 26 projecting from one end thereof (the third helical spring 40 being connected to the other end thereof) and through an aperture in the semi-rotatable portion 22a, such that the locking release 25 is housed substantially within the semi-rotatable portion 22a, whilst the foot button 26 is located externally of the semi-rotatable portion 22a.

Figure 6A:
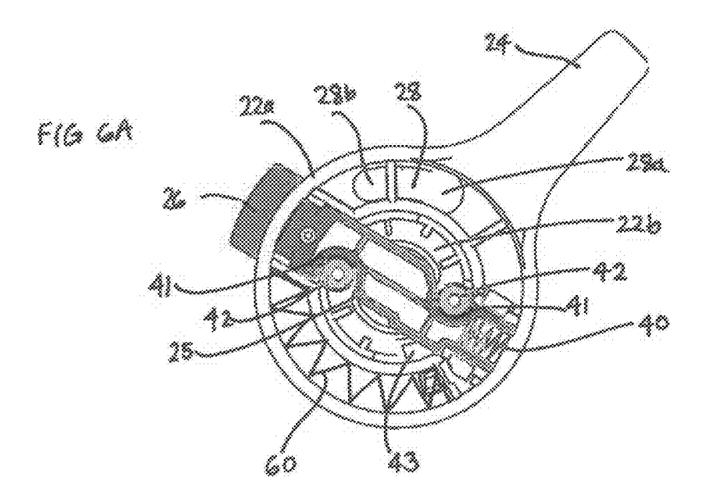
FIGS. 6A and 6B are end views of the wheel locking mechanism shown in FIGS. 2A to 2C.

FIG. 6A shows the wheel locking mechanism 10 in the configuration where the relative positions of the rotatable and non-rotatable members 20, 22 are unlocked, such that the wheel 13 is free to rotate; the locking actuator 24 is in a non-use position (i.e. rotated upwardly as compared to its use position) and the locking release 25 is in a primed position, whereby the first helical spring 60 (connecting the rotatable and non-rotatable members 20, 22) is relaxed and the third helical spring 40 (connecting one end of the locking release 25 to the semi-rotatable portion 22a) is compressed.

The flattened bar of the locking release 25 is provided in each of its long edges with a pair of notches 41 which are co-operable with a pair of elongate stops 42 (elongate in the direction into the page, as shown) provided in the non-rotatable housing 22b. The notches 41 are rotationally symmetrical about a pivot point in the flattened bar. Each elongate stop 42 fits snugly into a notch 41, as shown in FIG. 6A.

To maintain the third helical spring 40 under compression, such that the locking release 25 is in its primed position, each notch 41 of the locking release 25 is stopped against an elongate stop 42 of the non-rotatable housing 22b, and the first helical spring 60 is relaxed.

Figure 6B:
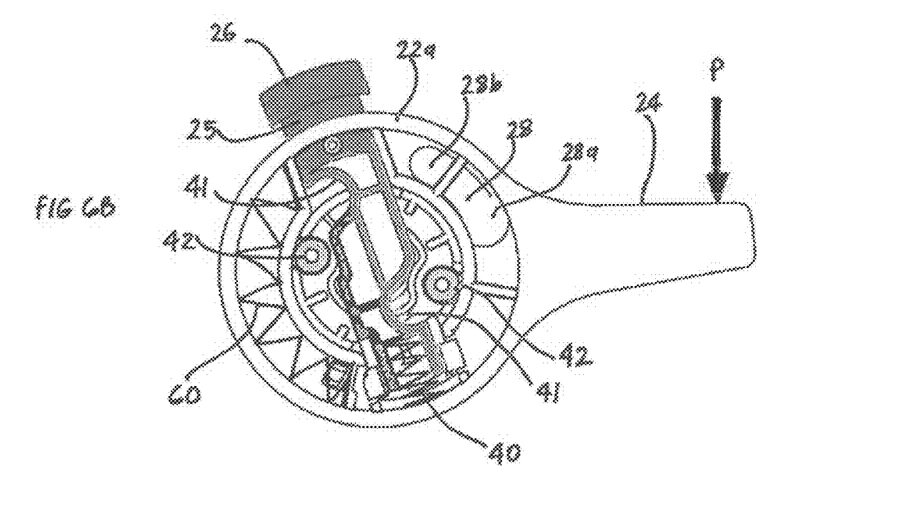

FIG. 6B shows the wheel locking mechanism 10 in the configuration where the relative positions of the rotatable and non-rotatable members 20, 22 are locked, such that the wheel 13 is prevented from rotating; the locking actuator 24 is in a use position (i.e. rotated downwardly as compared to its non-use position) and the locking release 25 is in a non-primed position, whereby the first helical spring 60 (connecting the rotatable and non-rotatable members 20, 22) is under tension and the third helical spring 40 (connecting one end of the locking release 25 to the semi-rotatable portion 22a) is relaxed.

Each notch 41 on the locking release 25 has been rotated out of cooperation with the pair of elongate stops 42 provided in the non-rotatable housing 22b by virtue of rotation of the locking actuator 24 into its use position. Once a critical point of rotation of the locking release 25 compared to the non-rotatable housing 22b is reached, the notches 41 disengage with the stops 42, thereby allowing the compression in the third helical spring 30 to be released, which forces the locking release 25, and in particular the foot button 26, upwardly out of the aperture in the semi-rotatable portion 22a. With the third helical spring 40 relaxed, the locking release 25 is in its non-primed position.

The non-rotatable housing 22b further comprises an abutment 43, shown in. FIGS. 6A and 7B, against which the locking release 25 abuts when in its non-primed position, as shown in FIGS. 6B and 7A (the abutment 43 being hidden from view in FIGS. 6B and 7A).

The wheel locking mechanism 10 is held in the configuration shown in FIGS. 6B and 7A by virtue of engagement of the locking pin 23 with a recess 21b of the locking surface 21 of the rotatable member 20; the locking pin 23 and its associated mechanism, along, with the rotatable member 20, are located behind the components shown in FIGS. 6A, 6B. 7A and 7B.

It is therefore clear to see that actuation of the locking actuator 24 to cause it to move from its non-use position to its use position causes the locking release 25 to move from its primed position to its non-primed position. In particular, actuation of the locking actuator 24 causes the locking release 25 to move out of contact with the elongate stops 42, thereby releasing compression in the third helical spring. Further particularly, actuation of the locking actuator 24 causes rotation of the semi-rotatable portion 22a and the ramped surface 28 thereof, whereby the locking pin 23 is caused to cooperate with the locking surface 21 of the rotatable member 20.

In reverse, release of the locking release 25 by actuation of the foot button 26 causes the locking release 25 to move out of contact with the abutment 43, thereby releasing tension in the first helical spring 60 connecting the semi-rotatable portion 22a to the non-rotatable housing 22b. The restorative force of the first helical spring 60 causes rotation of the semi-rotatable portion 22a from its use position to its non-use position, which causes rotation of the locking release 25 to a position in which the notches 41 therein reengage with the elongate stops 42 on the non-rotatable housing 22b, thus (re)compressing the third helical spring 40. In addition, release of the locking release 25 causes rotation of the ramped surface 28 of the semi-rotatable portion 22a such that the locking pin 23 is caused to be non-cooperative with the locking surface 21, i.e. the locking pin 23 is caused to pivot out of cooperation with the locking surface 21 or the rotatable member 20.

For the avoidance of any doubt, although it is clear from the above description and the accompanying drawings, rotation of the semi-rotatable portion 22a caused by release of the locking release 25 is in an opposite rotational direction to the rotation caused by actuation of the locking actuator 24.

Figure 8:
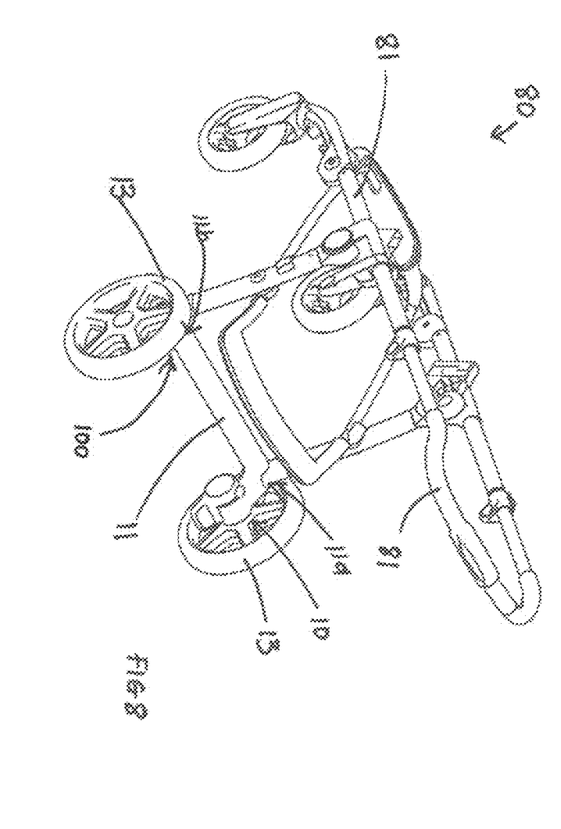
FIG. 8 is a perspective view of a pushchair according to the invention incorporating a a wheel locking mechanism according to FIGS. 1A to 1C and a further wheel locking mechanism.
Figure 9:
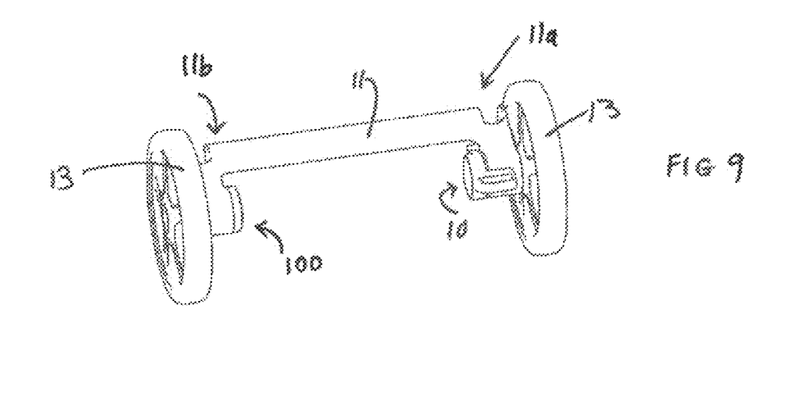
Figure 10:
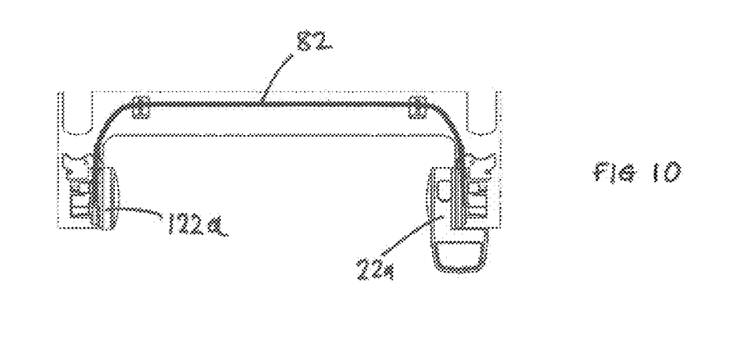
FIG. 10 is detail of the part of the pushchair shown in FIG. 9.

Turning to FIG. 8, there is shown a pushchair 80 comprising a chassis 81 having a rear axle 11, at each end of which a wheel 13 is mounted. At a first end 11a of the rear axle 11, a wheel locking mechanism 10 is provided; at a second end 11b of the rear axle 11, a further wheel locking mechanism 100 is provided. This configuration is shown in more detail in FIGS. 9 and 10.

The wheel locking mechanism 10 is as hereinbefore described. The further wheel locking mechanism 100 is similar in construction to, and provides the same locking and unlocking function as, the wheel locking mechanism 10, however, clearly there are differences. It is these differences that will be described in more detail below (with reference numerals increased by 100 being used for the same components are as used for the wheel locking mechanism 10).

The further wheel locking mechanism 100 includes a semi-rotatable portion 122a (part of the non-rotatable member 122) however it does not include a locking actuator and does not house a locking release. Instead, a linking cable 82 is provided linking the semi-rotatable portion 22a of the wheel locking mechanism 10 with the semi-rotatable portion 122a of the further wheel locking mechanism 100, such that the action and consequences of actuation of the locking actuator 24 and locking release 25 of the wheel locking mechanism 10 are transmitted by the linking cable 82 and replicated in the wheel locking mechanism 100.

Figure 11:
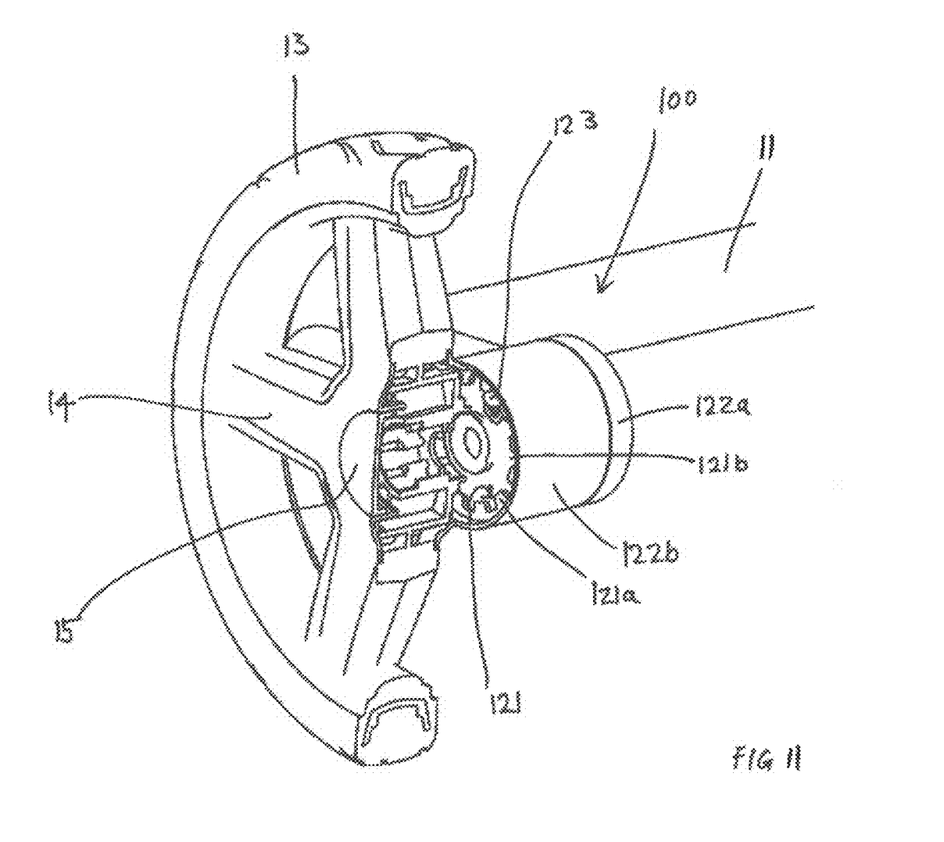
FIG. 11 is a perspective view, shown partially cut-away, of the further wheel locking mechanism shown in FIGS. 8, 9 and 10.

FIG. 11 shows that the locking pin 123 is mounted in, and is non-rotatable with respect to, the non-rotatable housing 122b of the non-rotatable member 122, i.e. the angular position of the locking pin 123 with respect to the plane of the non-rotatable housing 122b is fixed. Selective movement of the locking actuator 24 of the wheel locking mechanism 10, view the linking cable 82, causes the locking pin 123 to pivot into cooperation with the locking surface 121 of the rotatable member 120 such that the relative positions of the rotatable and non-rotatable members 120, 122 are lockable, whilst subsequent movement of the locking release 25 of the wheel locking mechanism 10, via the linking cable 82, causes the locking pin 123 to pivot out of cooperation with the locking surface 121 of the rotatable member 120, such that the relative positions of the rotatable and non-rotatable members 120, 122 are unlockable.

Because the locking surface 121 is a toothed surface, the locking pin 123 is caused to either (1) immediately lock into a recess 121b between two adjacent teeth 121a on the toothed surface, or (2) pivot into a primed position in contact with the toothed surface, prior to being urged into a recess 121b between two adjacent teeth 121a on the toothed surface. Such urging may be achieved, in part, by a slight nudge of the pushchair in either a forward or backward direction to provide the further amount of rotation required to cause the locking pin 123 to align with a recess 121b and lock into position therein.

The invention claimed is:

1. A wheel locking mechanism, suitable for locking a wheel of a pushchair, the mechanism comprising:
    a rotatable member, adapted to be mounted on the hub of a wheel, whereby the rotatable member is co-rotatable with, and by rotation of, the wheel, said rotatable member comprising a locking surface;
    a non-rotatable member, comprising a locking pin adapted to selectively cooperate with the locking surface of the rotatable member, whereby the relative positions of the rotatable and non-rotatable members are lockable;
    wherein the non-rotatable member comprises a semi-rotatable portion and a non-rotatable housing, wherein the semi-rotatable portion is mounted on, and is semi-rotatable with respect to, the non-rotatable housing;
    wherein the semi-rotatable portion includes a ramped surface, adapted to face into the non-rotatable housing, wherein the ramped surface extends in the direction of rotation of the semi-rotatable portion;
    wherein the locking pin is pivotally and slidably mounted with respect to the ramped surface;
    wherein the locking pin is pivotally mounted with respect to a first end of a movable bar; and,
    wherein a second end of the movable bar is in sliding contact with the ramped surface of the semi-rotatable portion, whereby the locking pin is slidable towards and away from the semi-rotatable portion.

2. A wheel locking mechanism as claimed in claim 1, wherein the rotatable member further comprises a locking actuator and a locking release.

3. A wheel locking mechanism as claimed in claim 2, wherein the locking pin is pivotally mounted with respect to both the locking actuator and the locking release.

4. A wheel locking mechanism as claimed in claim 3, wherein the locking pin is slidably mounted with respect to both the locking actuator and the locking release.

5. A wheel locking mechanism as claimed in claim 4, wherein the locking pin is resiliently mounted with respect to both the locking actuator and the locking release.

6. A wheel locking mechanism as claimed in claim 3, wherein the locking actuator is selectively movable to cause the locking pin to pivot into cooperation with the locking surface of the rotatable member.

7. A wheel locking mechanism as claimed in claim 1, wherein the locking surface is a toothed surface, and wherein the locking pin is caused to immediately lock into a recess between two adjacent teeth on the toothed surface.

8. A wheel locking mechanism as claimed in claim 1, wherein the locking surface is a toothed surface, and wherein the locking pin is caused to pivot into a primed position in contact with the toothed surface, prior to being urged into a recess between two adjacent teeth on the toothed surface.

9. A wheel locking mechanism as claimed in claim 1, wherein a locking release is movable to cause the locking pin to pivot out of cooperation with the locking surface of the rotatable member, whereby the relative positions of the rotatable and non-rotatable members are unlockable.

10. A wheel locking mechanism as claimed in claim 1, wherein the semi-rotatable portion is resiliently mounted on the non-rotatable housing.

11. A wheel locking mechanism as claimed in claim 10, wherein a first helical spring connects the semi-rotatable portion to the non-rotatable housing.

12. A wheel locking mechanism as claimed in claim 1, wherein the locking pin is mounted in, and is non-rotatable with respect to, the non-rotatable housing.

13. A wheel locking mechanism as claimed in claim 1, wherein the locking pin is resiliently mounted with respect to the ramped surface.

14. A wheel locking mechanism as claimed in claim 1, wherein the locking pin is slidable towards and away from both the locking actuator and the locking release.

15. A wheel locking mechanism as claimed in claim 1, wherein the locking pin is resiliently mounted with respect to the first end of the movable bar.

16. A wheel locking mechanism as claimed in claim 1, wherein the locking release is resiliently mounted with respect to, and movable with, the locking actuator.

17. A wheel locking mechanism as claimed in claim 16, wherein a third helical spring is provided to resiliently mount the locking release with respect to the locking actuator.

18. A pushchair comprising a chassis having a rear axle, at each end of which a wheel is mountable, wherein each end of the rear axle is provided with a wheel locking mechanism according to claim 1.

19. A wheel locking mechanism, suitable for locking a wheel of a pushchair, the mechanism comprising:

a rotatable member, adapted to be mounted on the hub of a wheel, whereby the rotatable member is co-rotatable with, and by rotation of, the wheel, said rotatable member comprising a locking surface;

a non-rotatable member, comprising a locking pin adapted to selectively cooperate with the locking surface of the rotatable member, whereby the relative positions of the rotatable and non-rotatable members are lockable;

wherein the non-rotatable member comprises a semi-rotatable portion and a non-rotatable housing, wherein the semi-rotatable portion is mounted on, and is semi-rotatable with respect to, the non-rotatable housing;

wherein the semi-rotatable portion includes a ramped surface, adapted to face into the non-rotatable housing, wherein the ramped surface extends in the direction of rotation of the semi-rotatable portion;

wherein the locking pin is pivotally and slidably mounted with respect to the ramped surface;

wherein the locking pin is pivotally mounted with respect to a first end of a movable bar; and, wherein the locking pin is slidable towards and away from both the locking actuator and the locking release.

20. A pushchair comprising a chassis having a rear axle, at each end of which a wheel is mountable, wherein each end of the rear axle is provided with a wheel locking mechanism according to claim 19.

21. A wheel locking mechanism, suitable for locking a wheel of a pushchair, the mechanism comprising:

a rotatable member, adapted to be mounted on the hub of a wheel, whereby the rotatable member is co-rotatable with, and by rotation of, the wheel, said rotatable member comprising a locking surface;

a non-rotatable member, comprising a locking pin adapted to selectively cooperate with the locking surface of the rotatable member, whereby the relative positions of the rotatable and non-rotatable members are lockable;

wherein the non-rotatable member comprises a semi-rotatable portion and a non-rotatable housing, wherein the semi-rotatable portion is mounted on, and is semi-rotatable with respect to, the non-rotatable housing;

wherein the semi-rotatable portion includes a ramped surface, adapted to face into the non-rotatable housing, wherein the ramped surface extends in the direction of rotation of the semi-rotatable portion;

wherein the locking pin is pivotally and slidably mounted with respect to the ramped surface; and, wherein the locking pin is pivotally and resiliently mounted with respect to a first end of a movable bar.

22. A wheel locking mechanism as claimed in claim 21, wherein a second helical spring connects the locking pin to the first end of the movable bar.

23. A pushchair comprising a chassis having a rear axle, at each end of which a wheel is mountable, wherein each end of the rear axle is provided with a wheel locking mechanism according to claim 21.

\* \* \* \* \*